United States Patent
Gabas Cebollero

[11] Patent Number: 5,829,906
[45] Date of Patent: Nov. 3, 1998

[54] LINKING MECHANISM FOR CONTROL CABLE TERMINALS

[75] Inventor: Carlos Gabas Cebollero, Barcelona, Spain

[73] Assignee: Fico Cables, S.A., Barcelona, Spain

[21] Appl. No.: 875,434
[22] PCT Filed: Sep. 16, 1996
[86] PCT No.: PCT/ES96/00176
  § 371 Date: Jun. 30, 1997
  § 102(e) Date: Jun. 30, 1997
[87] PCT Pub. No.: WO97/16653
  PCT Pub. Date: May 9, 1997

[30] Foreign Application Priority Data
Oct. 30, 1995 [ES] Spain ............... 9502102

[51] Int. Cl.⁶ ............................................. F16C 11/10
[52] U.S. Cl. .................... 403/76; 403/4; 403/122; 403/326; 74/502.6
[58] Field of Search ............ 403/76, 122, 164, 403/165, 141, 71, 67, 329, 326, 135, 4; 74/502.6; 285/319, 340

[56] References Cited

U.S. PATENT DOCUMENTS 4,581,953  4/1986  Walston et al. .
4,694,705  9/1987  Frankhouse et al. ............ 403/141 X
4,947,704  8/1990  Gokee ............................. 403/141 X

FOREIGN PATENT DOCUMENTS 2713729  6/1995  France .

Primary Examiner—Harry C. Kim
Assistant Examiner—John R. Cottingham
Attorney, Agent, or Firm—Michael J. Striker

[57] ABSTRACT

This mechanism is applicable to terminals (1) of thrust-traction control cables formed by an articulating body (6) designed to receive and retain an articulating extension (12) of an actuating control, they being arranged orthogonally with respect to each other and being capable of rotation. The articulating body (6) is single-piece and has a housing (11) with two equal inlet mouths (A1, B1) of freely choosable alternative use situated one on either side. In the housing (11) there are retaining means formed by axial grooves (17) from the bottom (19) of which there emerge respective retaining tabs (18) which, capable of rotation in both directions, are designed so that the coupling force (F) is of lower intensity than the uncoupling force (F').

2 Claims, 1 Drawing Sheet

LINKING MECHANISM FOR CONTROL CABLE TERMINALS

TECHNICAL FIELD OF THE INVENTION

The object of the invention is a linking mechanism for control cable terminals, which is of general application on control cables which work subjected to thrust-traction forces and which are usually known as push-pull operating cables. In particular, the linking mechanism of the invention is applicable to thrust-traction control cables generally used in the automobile industry as a means of linkage between the gearbox and its operating shift lever inside the passenger compartment of the vehicle.

BACKGROUND OF THE INVENTION

Known in the art are a wide variety of thrust-traction control cables which link an actuating control with the mechanism or device to which it is attached. These control cables essentially consist in a sheathed steel cable one end of which has a terminal which, when coupled to the actuating control, forms an articulated coupling which permits the thrust-traction forces applied on the actuating control to be transmitted by the steel cable.

The known embodiments of terminals such as those cited comprise an articulating body attached to the steel cable of the control cable by means of a rigid linking piece, formed for example by an axially arranged metal rod. Coupling of the terminal with the actuating control is implemented by means of an articulating extension which, orthogonally arranged with respect to an actuating arm, is mounted with a tight fit in a housing made for the purpose in the articulating body. In broad terms, the articulation which makes up the coupling of the articulating body with the articulating extension is either a ball or ball-joint articulation or an articulation in which the articulating body and extension are permanently orthogonally arranged and can rotate with respect to each other, unlike the ball articulation in which the position of both parts, articulating body and extension, can occupy positions other than orthogonally mounted positions.

As an example of embodiment of a control cable terminal in which the coupling of the articulating body with the articulating extension of the actuating control forms an articulation in which both parts, articulating body and extension, work orthogonally arranged, we might cite U.S. Pat. 4,581,953, which, in addition to including the aforesaid parts, describes a shock-absorbing sleeve mounted in the housing of the articulating body.

In the known embodiments of terminals described above, the means of coupling of the terminal with the actuating control consist in a single opening made in the articulating body to permit entry by pressure of the articulating extension in a housing in which it is retained; this coupling arrangement has the clear disadvantage that, in general, it requires prior positioning of the terminal with respect to the articulating extension. This disadvantages becomes especially important when the actuating control is constituted by the actuating shift lever of the gearbox of an automobile vehicle; in this case, positioning of the terminal for reception of the articulating extension generally requires rotation of the control cable about its axis when the articulating extension takes up a fixed position, which, given the difficulty of access to the articulating extension, means that the coupling of the cable terminal calls for long execution times which increase fitting costs.

Another disadvantage presented by the known embodiments of terminals such as those described above consists in the fact that the means which retain the articulating extension in the housing of the articulating body operate, once coupled, in such a way that the force which has to be applied to achieve insertion of the articulating extension in said housing is equal in intensity to the force which has to be applied to achieve its withdrawal, which can under some circumstances lead to inopportune uncoupling of the terminal.

EXPLANATION OF THE INVENTION

A linkage mechanism for control cables of new structure and operation is made known hereby in order to provide a solution to the above-described disadvantages presented by the known embodiments of terminals for control cables, which once coupled to the actuating control form an articulation in which the articulating body of the terminal and the articulating extension-of the actuating control are orthogonally arranged.

The linking mechanism of the invention is applicable to terminals of thrust-traction control cables made up of a sheathed steel cable, in which the terminal is preferably made by injection of plastic material and forms an articulating body which can adopt any configuration suitable for each specific case of application, with the corresponding end of the steel cable having means for firm coupling thereof with the terminal which, preferably, comprises an axially mounted metal rod which is included in the terminal as it is formed.

The linking mechanism of the invention is characterized in that the articulating body, having a passage of circular cross section transversally arranged with respect to the longitudinal axis of the means of coupling of the steel cable, is of a single piece and forms two equal inlet mouths of freely choosable alternative use situated on either side of the articulating body. The transversal passage forms a housing for reception with a tight fit of an articulating extension of generally cylindrical shape attached orthogonally to an articulating arm of an actuating control, with the interior end of the articulating extension, which is that adjacent to the articulating arm, having a perimetral support projection, a perimetral retaining groove on its intermediate portion, and at its free end and emerging from the perimetral retaining groove a generally ball-shaped termination of a diameter greater than that of the groove. The articulating body has, centrally arranged with respect to the housing, elastically deformable retaining means so adapted that entry of the articulating extension through one or the other of the inlet mouths in the housing of the articulating body is implemented by applying a force which, when axially directed with respect to the longitudinal axis of the housing, provokes a double elastic deformation of the retaining means which are housed in the retaining groove, while the corresponding side of the articulating body rests on the supporting projection of the articulating extension, and withdrawal of the articulating extension through the corresponding inlet mouth is implemented by applying a force in the opposite direction to the previous one and of greater intensity, which leads to double elastic deformation of the retaining means.

The retaining means in the housing of the articulating body are characterized in that they comprise a plurality of grooves, preferably four in number, axially arranged with respect to the longitudinal axis of the transversal passage and regularly distributed, upon which, centered and starting from their bottom part, there is a respective retaining tab mounted orthogonally and of a size coinciding with that of the groove and capable of rotation in both directions around its interior end, the free ends of the retaining tabs forming a central passage of a theoretical diameter smaller than that of the retaining groove of the articulating extension.

The aforesaid characteristics of the linking mechanism for control cable terminals of the invention provides a solution to all the above-described disadvantages presented by the known embodiments of this type of terminals. In the first place, the characteristic arrangement of the articulating body and of the retaining means of the terminal, permitting coupling of the articulating extension of the actuating control through either of the inlet mouths of the housing of the articulating body, greatly facilitates fitting of the terminal. And, in the second place, the fact that the retaining means operate asymmetrically, that is, that the force which has to be applied in order to achieve entry of the articulating extension in the housing of the articulating body is of an intensity lower than the force which has to be applied in the opposite direction to achieve its removal, prevents under normal working conditions the possibility of the terminal, once coupled, coming away from the actuating control in an inopportune manner.

BRIEF DESCRIPTION OF THE DRAWINGS

The drawings sheet of the present specification shows the linking mechanism for control cable terminals of the invention. In said drawings.

DETAILED DESCRIPTION OF THE EXAMPLE OF EMBODIMENT

Figure 1:
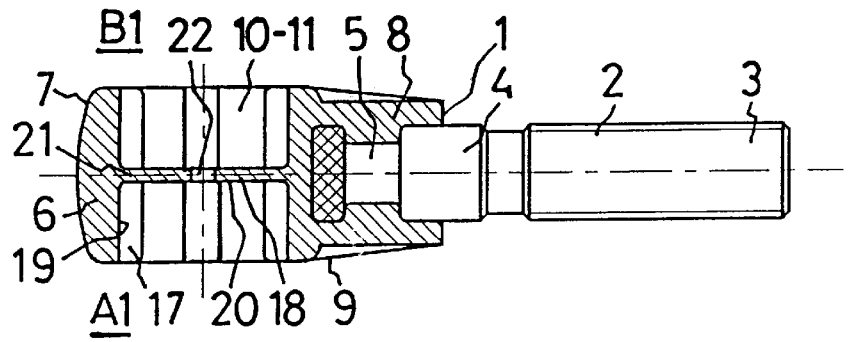
FIG. 1 is a longitudinal-section view of the terminal of the linking mechanism of the invention.
Figure 3:
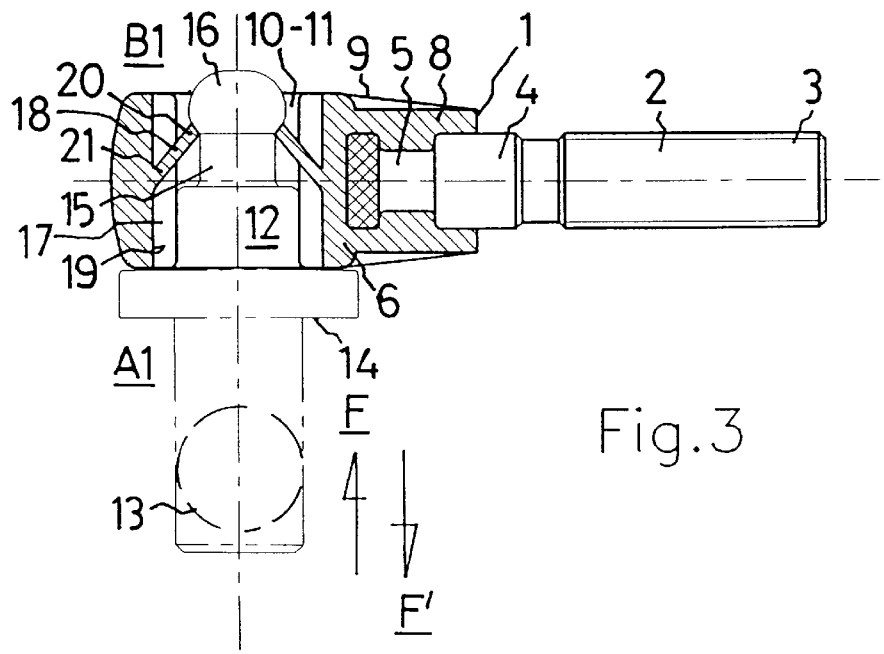
FIG. 3 is a longitudinal-section view of the linking mechanism of the invention.

The linking mechanism for control cable terminals of the invention, described below as an example of embodiment, is applicable to a terminal 1 of a thrust-traction control cable essentially made up of a steel cable provided with a sheath of which, for the purposes of achieving greater clarity of outline, the figures of the drawings sheets show only a metal rod 2, which is fixed by its back end 3 to the corresponding end of the steel cable, while its front end 4 has a coupling extension 5 which is included in the terminal 1 as shown in FIGS. 1 and 3.

The terminal 1 is preferably made by injection of plastic material and forms an articulating body 6 of generally cylindrical shape and with a convex side wall 7 from which there projects orthogonally a cylindrical coupling portion 8 provided with four structural reinforcement ribs 9, while the coupling extension 5 of the metal rod 2 is included in the coupling portion 8. As stated above, the terminal 1 can adopt any other suitable configuration without this affecting the essential nature of the invention, the terminal 1 shown in the figures of the drawing sheets being provided solely by way of illustrative example.

The figures of the drawing sheets show how the articulating body 6 has a passage 10 longitudinally arranged with respect to the longitudinal axis of the rod 2 which forms two equal inlet mouths A1 and B1 respectively, situated one on each side of the articulating body 6. The passage 10 forms a housing 11 of dimensions such as to receive with a tight fit an articulating extension 12, shown in FIG. 3 by means of thinner lines, attached orthogonally to an articulating arm 13 of an actuating control which is not shown. The articulating extension 12 is of generally cylindrical shape and forms at its interior end a perimetral support projection 14, at its intermediate portion a perimetral retaining groove 15, and at its free end and emerging from the retaining groove 15 a ball 16 of larger diameter than that of the groove 15.

Figure 2:
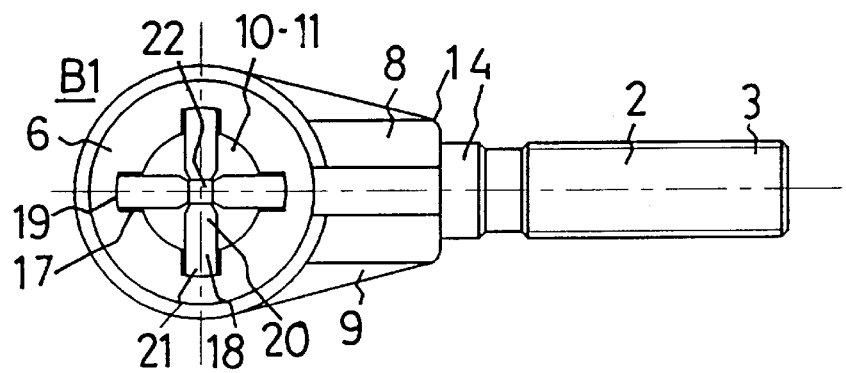
FIG. 2 is a plan view of the terminal of the linking mechanism of the invention.

FIGS. 1 and 2 show how in the transversal passage 10 there are four equal grooves 17 arranged axially and regularly distributed which extend throughout the entire length of the articulating body 6. FIG. 1 shows how in each groove 17 there is a retaining tab 18 which, emerging from the bottom 19 of the groove 17, extends orthogonally. FIG. 2 shows how each retaining tab 18 has an outline of generally rectangular shape, of a size which matches that of the groove 17 which contains it, the free ends 20 of the retaining tabs 18 forming a central passage 22 of smaller theoretical diameter than that of the retaining groove 15 of the articulating extension 12. Thus arranged, the retaining tabs 18 can be rotated in both directions around their interior end 21, one of said rotation directions being shown in FIG. 3. It is understood that the number of retaining tabs 18 can be other than four, for example three, and that their general configuration can be other than rectangular, these retaining tabs being, for example, of trapezoidal format in which their smaller base constitutes their free end, with this in no way affecting the essential nature of the invention.

The operation of the linking mechanism for control cable terminals of the invention is described below. FIG. 3 shows how coupling of the articulating extension 12 of the actuating device with the articulating body 6 of the terminal is implemented through the inlet mouth A1; it is understood that, given the symmetrical arrangement of the articulating body 6 and of the retaining means formed by the axial grooves 17 and the retaining tabs 18, the articulating extension 12 can be inserted into the housing 11 of the articulating body 6 through either inlet mouth A1 or B1. Entry of the articulating extension 12 in the housing 11 by applying an axially directed force F produces by means of the ball 16 a first elastic deformation of the retaining tabs 18 which are rotated around their interior end 21 and housed in the axial grooves 17; the advancing movement of the articulating extension 12 provokes, by elastic deformation of the retaining tabs 18, another elastic deformation of same rotating in the opposite direction to the previous one and in such a way that their free ends 20 rest pressing on the zone of intersection of the ball 16 with the retaining groove 15, while at the same time the perimetral projection 14 and the articulating body 6 come into contact, stopping the advancing movement of the articulating extension 12 and leaving the coupling of the terminal 1 firmly established. In these conditions, the retaining tabs 18 are arranged forming a certain angularity oriented in the direction of advance of the coupling of the articulating extension 12, permitting mutual rotation of the terminal 1 and the articulating extension 12.

Withdrawal of the articulating extension 12 from the housing 11 is implemented by applying an axially directed force F' in the opposite direction to the previous force F, the intensity of this uncoupling force F' being considerably greater than the intensity of the coupling force F; this is so due to the arrangement of the retaining tabs 18 since, due to their arrangement forming a certain angularity, the application of an uncoupling force F' provokes corresponding initial reactions through the retaining tabs 18 on the articulating body 6, in such a way that, once the intensity of the force F' overcomes said reactions, there arises a first elastic deformation of the retaining tabs 18 by rotating around their interior end 21 resting on the ball 16, so that, when the maximum diameter of the ball 16 has been exceeded, there begins a second elastic reaction by rotation of the retaining tabs 18 in a direction opposite to the previous direction until the rest position shown in FIG. 1 is reached, leaving the terminal 1 ready for further coupling with the articulating extension 12 in the way described above.

I claim:

1. Linking mechanism for control cable terminals, which is applicable to terminals of thrust-traction control cables made up of a sheathed steel cable, in which the terminal (1) is made by injection of plastic material and forms an articulating body (6) which can adopt any configuration suitable for each specific case of application, the corresponding end of the steel cable having means for firm coupling thereof with the terminal (1) which, preferably, comprise an axially arranged metal rod (2) which is included in the terminal (1) while the latter is being formed, characterized in that the articulating body (6), having a passage (10) of circular cross section transversally arranged with respect to the longitudinal axis of the means of coupling of the steel cable, is of a single piece and forms two equal inlet mouths (A1, B1) situated on either side of the articulating body (6), of freely choosable alternative use, while the transversal passage (10) forms a housing (11) for reception with a tight fit of an articulating extension (12) of generally cylindrical shape attached orthogonally to an articulating arm (13) of an actuating control, which has on its interior end, which is adjacent to the articulating arm (13), a perimetral support projection (14), a perimetral retaining groove (15) on its intermediate portion, and at its free end and emerging from the perimetral groove (15) a generally ball-shaped termination (16) of a diameter greater than that of the groove (15); the articulating body (6) has, centrally arranged with respect to the housing (11), elastically deformable retaining means (17, 18) so adapted that entry of the articulating extension (12) through one or the other of the inlet mouths (A1, B1) in the housing (11) of the articulating body (6) is implemented by applying a force (F) which, when axially directed with respect to the longitudinal axis of the housing (11), provokes a double elastic deformation of the retaining means (18) which are housed in the retaining groove (15), while the corresponding side of the articulating body (6) rests on the supporting projection (14), and withdrawal of the articulating extension (12) through the corresponding inlet mouth (A1, B1) is implemented by applying a force (F') in the opposite direction to the previous one and of greater intensity, which leads to double elastic deformation of the retaining means (18).

2. Linking mechanism as claimed in claim 1, characterized in that the retaining means comprise a plurality of grooves (17), axially arranged with respect to the longitudinal axis of the transversal passage (10) and regularly distributed, upon which, centered and starting from their bottom part (19), there is a respective retaining tab (18) mounted orthogonally and of a size coinciding with that of the groove (17) and capable of deflection in both directions around its interior end (21), the free ends (20) of the retaining tabs (18) forming a central passage (22) of a theoretical diameter smaller than that of the retaining groove (15) of the articulating extension (12).

* * * * *